(12) United States Patent
Acosta Aponte et al.

(10) Patent No.: US 11,492,038 B2
(45) Date of Patent: Nov. 8, 2022

(54) METHOD FOR ASCERTAINING AND/OR MONITORING A MECHANICAL STATE OF A TIE ROD APPARATUS

(71) Applicant: Robert Bosch GmbH, Stuttgart (DE)

(72) Inventors: Axel Javier Acosta Aponte, Stuttgart (DE); Tobias Schmid, Stuttgart (DE); Klaus Wintermayr, Eschach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/259,345

(22) PCT Filed: Jul. 9, 2019

(86) PCT No.: PCT/EP2019/068374
§ 371 (c)(1),
(2) Date: Jan. 11, 2021

(87) PCT Pub. No.: WO2020/016052
PCT Pub. Date: Jan. 23, 2020

(65) Prior Publication Data
US 2021/0323602 A1    Oct. 21, 2021

(30) Foreign Application Priority Data

Jul. 16, 2018 (DE) ...................... 10 2018 211 764.0

(51) Int. Cl.
*B62D 5/04* (2006.01)
*B62D 7/20* (2006.01)
*B62D 9/00* (2006.01)

(52) U.S. Cl.
CPC ......... *B62D 5/0481* (2013.01); *B62D 5/0484* (2013.01); *B62D 7/20* (2013.01); *B62D 9/00* (2013.01)

(58) Field of Classification Search
None
See application file for complete search history.

(56) References Cited

U.S. PATENT DOCUMENTS 6,442,462 B1 *  8/2002  Nishizaki ............... B62D 5/006
                                                 701/41
6,691,062 B1 *  2/2004  Nobis .................... G01M 17/06
                                                 702/159

(Continued)

FOREIGN PATENT DOCUMENTS

CN   101614532 A     12/2009
CN   101614532 A  *  12/2009  ............. G01B 17/00

(Continued)

OTHER PUBLICATIONS

International Search Report corresponding to PCT Application No. PCT/EP2019/068374, dated Oct. 17, 2019 (German and English Language Document) (7 pages).

*Primary Examiner* — Kevin R Steckbauer
(74) *Attorney, Agent, or Firm* — Maginot, Moore & Beck LLP (57) ABSTRACT

The disclosure proposes a method for ascertaining and/or monitoring a mechanical state of at least one tie rod apparatus of an electrically assisted steering system of a vehicle, wherein at least one operating characteristic variable, which is correlated to a steering movement, of at least one steering actuator and/or of at least one steering controller of the steering system is ascertained and evaluated for ascertaining and/or for monitoring the mechanical state of the tie rod apparatus.

14 Claims, 4 Drawing Sheets

(56) References Cited

U.S. PATENT DOCUMENTS

| | | | | |
|---|---|---|---|---|
| 8,175,773 | B2* | 5/2012 | Nishimori | B62D 5/0493 |
| | | | | 180/443 |
| 8,392,055 | B2* | 3/2013 | Schusteritz | B62D 5/0481 |
| | | | | 701/41 |
| 8,862,325 | B2* | 10/2014 | Soos | B62D 15/0235 |
| | | | | 701/41 |
| 8,989,966 | B2* | 3/2015 | Itamoto | B62D 5/0484 |
| | | | | 701/43 |
| 9,227,658 | B2* | 1/2016 | Ootake | B62D 5/049 |
| 9,393,994 | B2* | 7/2016 | Yamada | B62D 5/0481 |
| 9,434,404 | B2* | 9/2016 | Kuramochi | B62D 5/0487 |
| 9,493,182 | B2* | 11/2016 | Kim | B62D 5/0463 |
| 9,643,642 | B2* | 5/2017 | Kuramochi | B62D 6/008 |
| 9,776,657 | B1* | 10/2017 | Badiru | G07C 5/0808 |
| 9,821,838 | B2* | 11/2017 | Hori | G01L 5/221 |
| 10,180,378 | B2* | 1/2019 | Bourdrez | G01L 3/22 |
| 10,442,459 | B2* | 10/2019 | Siskoy | B62D 5/006 |
| 10,479,401 | B2* | 11/2019 | Engels | B62D 5/0496 |
| 10,549,775 | B2* | 2/2020 | Bourdrez | B62D 5/0481 |
| 10,620,068 | B2* | 4/2020 | Jo | B62D 6/10 |
| 11,084,526 | B2* | 8/2021 | Yu | B62D 5/0481 |
| 2002/0059021 | A1 | 5/2002 | Nishizaki | B62D 5/003 |
| | | | | 180/443 |
| 2010/0305803 | A1* | 12/2010 | Schusteritz | B62D 5/0481 |
| | | | | 701/31.4 |
| 2013/0030653 | A1* | 1/2013 | Soos | B62D 15/0235 |
| | | | | 701/41 |
| 2013/0253773 | A1* | 9/2013 | Itamoto | B62D 5/0484 |
| | | | | 701/43 |
| 2014/0121884 | A1* | 5/2014 | Engels | B62D 5/0496 |
| | | | | 701/33.9 |
| 2014/0360803 | A1* | 12/2014 | Hori | G01L 5/221 |
| | | | | 180/446 |
| 2015/0012178 | A1* | 1/2015 | Ootake | B62D 5/049 |
| | | | | 701/41 |
| 2015/0120139 | A1* | 4/2015 | Yamada | B62D 6/005 |
| | | | | 701/41 |
| 2015/0183453 | A1* | 7/2015 | Kim | B62D 5/0481 |
| | | | | 701/41 |
| 2015/0246683 | A1* | 9/2015 | Kuramochi | B62D 5/003 |
| | | | | 701/43 |
| 2015/0321692 | A1* | 11/2015 | Kuramochi | B62D 5/0496 |
| | | | | 701/43 |
| 2017/0023445 | A1* | 1/2017 | Bourdrez | G01L 3/22 |
| 2017/0144698 | A1* | 5/2017 | Bourdrez | G07C 5/0808 |
| 2018/0335357 | A1* | 11/2018 | Jo | G01L 25/003 |
| 2019/0009813 | A1* | 1/2019 | Siskoy | B62D 5/0484 |
| 2019/0359252 | A1* | 11/2019 | Yu | G06F 17/142 |
| 2020/0114952 | A1* | 4/2020 | Mayer | B62D 5/0424 |
| 2020/0189651 | A1* | 6/2020 | Hansson | G05D 1/021 |
| 2021/0016769 | A1* | 1/2021 | Mitsumoto | B62D 6/04 |
| 2021/0016829 | A1* | 1/2021 | Mitsumoto | B62D 15/025 |
| 2021/0053612 | A1* | 2/2021 | Kondo | B62D 5/0448 |
| 2021/0245803 | A1* | 8/2021 | Mayer | B60Q 9/00 |
| 2021/0323602 | A1* | 10/2021 | Acosta Aponte | B62D 7/20 |

FOREIGN PATENT DOCUMENTS

| | | | | |
|---|---|---|---|---|
| CN | 101614532 | B * | 7/2011 | ............ G01B 17/00 |
| CN | 112384431 | A * | 2/2021 | ............ B62D 5/0481 |
| DE | 198 15 470 | A1 | 10/1999 | |
| DE | 19815470 | A1 * | 10/1999 | ............. B60T 8/246 |
| DE | 102 44 070 | A1 | 3/2004 | |
| DE | 10244070 | A1 * | 3/2004 | ......... B62D 15/0245 |
| DE | 10 2006 043 069 | A1 | 3/2008 | |
| DE | 102006043069 | A1 * | 3/2008 | ........... B62D 5/0457 |
| DE | 19815470 | B4 * | 11/2009 | ............. B60T 8/246 |
| DE | 102006043069 | B4 * | 12/2009 | ........... B62D 5/0457 |
| DE | 102010032150 | A1 * | 1/2012 | ........... B62D 5/0481 |
| DE | 10 2010 062 499 | A1 | 6/2012 | |
| DE | 102010062499 | A1 * | 6/2012 | ............. B60T 8/885 |
| DE | 10 2011 008 337 | A1 | 7/2012 | |
| DE | 10 2013 008 830 | B3 | 7/2014 | |
| DE | 102013008830 | B3 * | 7/2014 | ........... B62D 5/0481 |
| DE | 10 2013 225 278 | A1 | 6/2015 | |
| DE | 102013225278 | A1 * | 6/2015 | ......... G01M 13/028 |
| DE | 102017117327 | A1 * | 2/2018 | ............. B62D 15/00 |
| DE | 102018211764 | A1 * | 1/2020 | ........... B62D 5/0481 |
| DE | 102018120629 | A1 * | 2/2020 | ............. B62D 1/16 |
| DE | 102017117327 | B4 * | 11/2021 | ............. B62D 15/00 |
| EP | 2893294 | B1 * | 7/2017 | ........... B60W 30/10 |
| JP | 2015160504 | A * | 9/2015 | ........... B62D 5/003 |
| JP | 5804201 | B2 * | 11/2015 | ........... B62D 5/0481 |
| WO | WO-2013179351 | A1 * | 12/2013 | ........... B62D 5/0481 |
| WO | WO-2014035320 | A1 * | 3/2014 | ........... B60W 30/10 |
| WO | 2019/096468 | A1 | 5/2019 | |
| WO | WO-2020016052 | A1 * | 1/2020 | ........... B62D 5/0481 |

\* cited by examiner

METHOD FOR ASCERTAINING AND/OR MONITORING A MECHANICAL STATE OF A TIE ROD APPARATUS

This application is a 35 U.S.C. § 371 National Stage Application of PCT/EP2019/068374, filed on Jul. 9, 2019, which claims the benefit of priority to Ser. No. DE 10 2018 211 764.0, filed on Jul. 16, 2018 in Germany, the disclosures of which are incorporated herein by reference in their entirety.

BACKGROUND

The disclosure relates to a method for ascertaining and/or for monitoring a mechanical state of a tie rod apparatus of an electrically assisted steering system of a vehicle.

The disclosure furthermore relates to a processing unit for carrying out such a method, and to a vehicle comprising an electrically assisted steering system with a tie rod apparatus, with a steering actuator and with a steering system control unit which comprises a processing unit for carrying out such a method.

DE 198 15 470 A1 has disclosed a method for ascertaining a mechanical state of a steering system, wherein adherence to or overshooting of tolerances and/or defined limit values is ascertained and evaluated with the aid of sensors, such as for example a steering angle sensor, a lateral acceleration sensor, a yaw rate sensor or a sensor arrangement of a closed-loop driving stability controller. In this case, sensor characteristic variables or actual values of the sensor data are consequently compared with corresponding setpoint values, which are subject to tolerances, in order to draw conclusions regarding the state of the steering system. The detection, evaluation and linking of a multiplicity of different sensor characteristic variables however requires a complex evaluation algorithm which requires a relatively large amount of processing power. Furthermore, with the stated method, only a mechanical state of the overall steering system can be ascertained, whereas it is not directly possible to draw conclusions regarding a state of a tie rod or of a tie rod apparatus.

It is the object of the disclosure in particular to provide a method for ascertaining and/or for monitoring a mechanical state of a tie rod apparatus with improved characteristics with regard to efficiency. The object is achieved by means of the features of the disclosure, whilst advantageous embodiments and refinements of the disclosure can be gathered from the disclosure.

SUMMARY

A method for, in particular automatically, ascertaining and/or for, in particular automatically, monitoring a mechanical state of at least one tie rod apparatus of an electrically assisted steering system of a vehicle, in particular of a motor vehicle, is proposed, wherein at least one operating characteristic variable, which is correlated with a steering movement, of at least one steering actuator and/or of at least one steering system control unit of the steering system is ascertained and is evaluated for the ascertainment and/or for the monitoring of the mechanical state of the tie rod apparatus. If, in the evaluation of the operating characteristic variable, a behavior of the operating characteristic variable which deviates from a normal state is detected, for example in the event of overshooting or undershooting of defined threshold values, then a fault state, in particular in the form of a mechanical defect of the tie rod apparatus, is inferred.

Here, the mechanical state of the tie rod apparatus may in particular be linked to a degree of steering play caused in particular by mechanical wear. By means of this embodiment, it is possible in particular to provide a method with improved efficiency, in particular performance efficiency, processing efficiency, component efficiency and/or cost efficiency. Furthermore, operational reliability can advantageously be increased, for example by virtue of the fact that worn-out tie rod heads can be identified in good time and, in this way, hazardous situations can be prevented.

In particular, in the present case, the steering system comprises the at least one tie rod apparatus, the at least one steering actuator, which in particular acts so as to provide electrical assistance, and the at least one steering system control unit. Furthermore, the steering system comprises in particular a processing unit which is provided for carrying out the method for the ascertainment and/or for the monitoring of the mechanical state of the tie rod apparatus. Furthermore, the steering system may in particular also comprise further components and/or assemblies, such as for example at least one steering handle for example in the form of a steering wheel, a wheel steering angle setting means in particular with at least one steering system setting element for example in the form of a toothed rack, at least one sensor unit for detecting the at least one operating characteristic variable, and/or an output unit for outputting an in particular acoustic, haptic and/or visual notification message and/or warning message if a fault state and/or behavior which deviates from the normal state is detected during the monitoring of the mechanical state of the tie rod apparatus. Furthermore, the steering system may in particular be in the form of a conventional steering system or in the form of a steer-by-wire steering system. A conventional steering system has in particular a direct mechanical connection between the steering handle and the wheel steering angle setting means in particular in the form of a steering gear, whereas a steer-by-wire steering system, in particular in at least one operating state, has no direct mechanical connection between steering handle and the wheel steering angle setting means, which in this case is in particular also referred to as "steering rack actuator". The expression "provided" is to be understood in particular to mean specially programmed, configured and/or equipped. The statement that an object is provided for a particular function is to be understood in particular to mean that the object performs and/or carries out said particular function in at least one state of use and/or operation.

Furthermore, a "tie rod apparatus" is to be understood in particular to mean a part and/or a subassembly of a tie rod of the steering system and/or of a component of the steering system which has an advantageously direct connection to a tie rod of the steering system, such as for example a tie rod bearing. Furthermore, the tie rod apparatus has in particular at least an operative connection to the wheel steering angle setting means, in particular to the steering system setting element, and/or to at least one vehicle wheel of the vehicle. Furthermore, a "steering actuator" is to be understood in particular to mean an actuator unit which is in particular of electrical design and which advantageously has a direct operative connection to the steering system setting element and which is in particular provided for transmitting a steering moment to the steering system setting element and thereby advantageously influencing a direction of travel of the vehicle. The steering actuator is preferably provided here for providing a steering moment for assisting a hand-imparted moment applied to the steering handle and/or providing a steering moment for, in particular directly, adjusting the steering system setting element and, in this way, in particular for the automatic and/or autonomous control of a direction of travel of the vehicle. For this purpose, the steering actuator may comprise at least one electric motor. Here, the electric motor is advantageously in the form of a brushless motor and preferably in the form of an asynchronous motor or in the form of a permanently excited synchronous motor. The steering actuator is preferably furthermore formed as part of the wheel steering angle setting means. Furthermore, a "processing unit" is to be understood in particular to mean an electrical and/or electronic unit which has an information input, and information processing means and an information output. The processing unit further has at least one processor, at least one operating memory, at least one input and/or output means, at least one operating program, at least one closed-loop control routine, at least one open-loop control routine, at least one calculation routine and/or at least one evaluation routine. In particular, the processing unit is provided for ascertaining and/or for receiving at least one operating characteristic variable, which is correlated with a steering movement, of the steering actuator and/or of the steering system control unit of the steering system and to evaluate same for the ascertainment and/or for the monitoring of the mechanical state of the tie rod apparatus. In particular, the processing unit may in this case be part of an, in particular central, external computer system, for example of a server network and/or cloud network. The processing unit is however advantageously integrated into the steering system control unit. Furthermore, an "operating characteristic variable" of the steering actuator and/or of the steering system control unit may in particular be understood to mean a characteristic variable which is correlated with an operation of the steering actuator and/or of the steering system control unit, in particular during a steering movement. Here, the operating characteristic variable may for example correspond to an energy consumption, a current consumption, and actual motor moment, a rotor position, a rotor angular acceleration, a rotor angular speed and/or a torque of the steering actuator, in particular during a steering movement, and/or to an energy consumption, a current consumption, a control signal, a setpoint motor moment and/or a setpoint torque of the steering system control unit, in particular during a steering movement. Here, an evaluation of the operating characteristic variable particularly advantageously takes place in a steering range in which forces acting on the tie rod apparatus, in particular a steering force exerted on the steering system setting element, advantageously a toothed-rack force, and a self-aligning force, which is in particular opposed to the steering force, of at least one vehicle wheel of the vehicle, at least substantially cancel one another out. The statement that a first force and a second force "at least substantially cancel one another out" is to be understood in particular to mean that an absolute value of a force resulting from the first force and the second force amounts to at most 15%, preferably at most 10% and particular preferably at most 5%, of an absolute value of the first force and/or of an absolute value of the second force. Here, the first force and the second force preferably oppose one another and deviate from one another at least in terms of magnitude by at most 15%, advantageously by at most 10% and particular preferably by at most 5%. Preferably, the steering range in which the first force and the second force at least substantially cancel one another out may also be ascertained on the basis of a change in sign of the resulting force.

It is furthermore proposed that, in particular in addition, at least one further operating characteristic variable which is correlated with the steering movement, and/or multiple further operating characteristic variables of the vehicle, preferably of the steering system and particularly advantageously of the steering actuator and/or of the steering control unit, are ascertained and taken into consideration in the ascertainment and/or monitoring of the mechanical state of the tie rod apparatus. In particular, in this context, the further operating characteristic variable could also correspond to an operating characteristic variable of a vehicle sensor arrangement, for example of a steering angle sensor, of a lateral acceleration sensor, of a yaw rate sensor, of a vehicle speed sensor, of a wheel rotational speed sensor and/or of a gyroscopic sensor, and/or to an operating characteristic variable of a closed-loop driving dynamics control system. Preferably, the further operating characteristic variable and/or the further operating characteristic variables are/is provided here for the verification and/or checking of plausibility of the state, ascertained in particular by means of the operating characteristic variable, of the tie rod apparatus. In this way, it is possible in particular to achieve advantageous verification and/or checking of plausibility of the operating characteristic variable.

It is furthermore proposed that the operating characteristic variable and/or the operating characteristic variables are/is detected and/or evaluated during driving operation of the vehicle. In this way, it is possible in particular to attain advantageous monitoring of the mechanical state of the tie rod apparatus, which is not directly perceptible to a driver and/or to an occupant of the vehicle.

Alternatively or in addition, it is proposed that the operating characteristic variable and/or the operating characteristic variables are/is detected and/or evaluated when the vehicle is at a standstill, whereby, in particular, particularly high operational reliability can be achieved, because the mechanical state of the tie rod apparatus can advantageously be checked already before driving operation.

It is furthermore proposed that the operating characteristic variable is linked to a closed-loop control characteristic, in particular a closed-loop control intervention, of a closed-loop steering system controller of the steering system, in particular for the, advantageously field-oriented, closed-loop control of the steering actuator. The closed-loop controller characteristic serves here in particular as an indicator of the mechanical state of the tie rod apparatus. In this context, use is advantageously made of the fact that a closed-loop controller characteristic of the closed-loop steering system controller in the normal state deviates from a closed-loop controller characteristic of the closed-loop steering system controller in the fault state, in particular in the steering range in which, in particular, the forces acting on the tie rod apparatus at least substantially cancel one another out. Consequently, in the ascertainment and/or monitoring of the mechanical state of the tie rod apparatus, it is the case in particular that the closed-loop controller characteristic of the closed-loop steering system controller is taken into consideration. In this way, it is possible in particular to achieve particularly simple monitoring of the mechanical state of the tie rod apparatus.

The operating characteristic variable could for example be detected, ascertained and/or evaluated over an entire steering cycle and/or over multiple steering cycles. Furthermore, the operating characteristic variable could in particular also be detected, ascertained and/or evaluated only intermittently, in particular in a defined time window, and/or only for particular steering angles. Furthermore, for the ascertainment and/or for the monitoring of the mechanical state of the tie rod apparatus, the operating characteristic variable could in particular also be integrated over multiple steering cycles, wherein, in particular, changes in the integration result could serve as an indicator for the mechanical state of the tie rod apparatus. Particularly simple evaluation can however be achieved if the operating characteristic variable is ascertained and/or detected at least during an entire steering cycle and, for the ascertainment and/or for the monitoring of the mechanical state of the tie rod apparatus, an evaluation signal, which is correlated with the operating characteristic variable, is generated by virtue of the operating characteristic variable being limited to a defined time window. Here, the time window advantageously lies in the steering range in which the forces acting on the tie rod apparatus at least substantially cancel one another out. Furthermore, the duration of the time window is in particular at least 50 ms, preferably at least 75 ms and particularly preferably at least 100 ms, and/or at most 500 ms, preferably at most 300 ms and particularly preferably at most 150 ms. By means of this configuration, it is possible in particular for an evaluation algorithm to be simplified by virtue of the evaluation advantageously being restricted to a range in the steering cycle which is relevant for the mechanical state of the tie rod apparatus.

The evaluation signal could subsequently be evaluated in the time domain, for example on the basis of the comparison of the evaluation signal with a setpoint and/or reference signal or on the basis of a characteristic profile of the evaluation signal in a fault state. It is however preferably proposed that a frequency spectrum is generated from the evaluation signal, and, for the ascertainment and/or for the monitoring of the mechanical state of the tie rod apparatus, at least one spectral characteristic variable of the frequency spectrum is compared with a reference characteristic variable. Here, the frequency spectrum may be generated in particular by means of a suitable frequency transformation, for example a Fourier transformation, advantageously a discrete Fourier transformation (DFT), implemented for example by means of a fast Fourier transformation (FFT), and/or Welch's method, and/or a periodogram. A "spectral characteristic variable" is to be understood in particular to mean a characteristic variable which is in particular correlated with the frequency spectrum and advantageously at least one, in particular defined, frequency value and/or amplitude value of the frequency spectrum. In particular, the spectral characteristic variable may also be at least one, preferably exactly one, in particular defined, frequency value and/or amplitude value of the frequency spectrum. Advantageously, the processing unit may infer a present state and/or a possible fault and/or defect of the tie rod apparatus, and/or ascertain a present state and/or a possible fault and/or defect of the tie rod apparatus, at least on the basis of the spectral characteristic variable and in particular by means of a comparison of the spectral characteristic variable with the reference characteristic variable. In this context, it is in particular also conceivable that the processing unit can, at least on the basis of the spectral characteristic variable and in particular by means of a comparison of the spectral characteristic variable with the reference characteristic variable, ascertain an impending and/or imminent fault and/or defect of the tie rod apparatus and/or estimate a likelihood of failure of the tie rod apparatus, for example by means of a "close to failure" detection. The processing unit may particularly preferably furthermore be provided for inferring a particular manner of fault and/or a particular fault type, and/or ascertaining a particular manner of fault and/or a particular fault type, on the basis of the spectral characteristic variable and in particular on the basis of a comparison of the spectral characteristic variable with the reference characteristic variable, for example on the basis of a particular deviation of the spectral characteristic variable from the reference characteristic variable. A "reference characteristic variable is to be understood in this context to mean in particular a characteristic variable, assigned to the spectral characteristic variable, preferably of a reference frequency spectrum which corresponds to the frequency spectrum, which characteristic variable reflects and/or indicates an intact and/or fully functional tie rod apparatus. The reference characteristic variable and/or the reference frequency spectrum may in this case be ascertained in particular by means of test measurements and/or by means of special algorithms and originate in particular from the tie rod apparatus itself and/or from further tie rod apparatuses of further, structurally identical steering systems. In this way, it is possible in particular to achieve a particularly straightforward evaluation of the operating characteristic variable with high accuracy.

It is furthermore proposed that at least one further operating characteristic variable is detected and a further evaluation signal is generated which is correlated with the further operating characteristic variable and which is limited to the time window and which is taken into consideration in the ascertainment and/or monitoring of the mechanical state of the tie rod apparatus. Here, the further operating characteristic variable is preferably the further operating characteristic variable already mentioned above, in particular for the verification and/or checking of plausibility of the state, ascertained in particular by means of the operating characteristic variable, of the tie rod apparatus. Preferably, the further operating characteristic variable is therefore not derived from the operating characteristic variable. Preferably, the further operating characteristic variable is furthermore ascertained and/or detected at least during an entire steering cycle, advantageously the same steering cycle as the operating characteristic variable. In particular, it may also be provided that multiple further operating characteristic variables are detected and a further evaluation signal limited to the time window is generated from each of the further operating characteristic variables, wherein, advantageously, each of the further evaluation signals is taken into consideration in the ascertainment and/or monitoring of the mechanical state of the tie rod apparatus. In this way, a particularly reliable and/or accurate ascertainment of the mechanical state of the tie rod apparatus can be achieved, in particular.

According to a further embodiment, it is proposed that, for the ascertainment and/or for the monitoring of the mechanical state of the tie rod apparatus, during an, in particular entire, monitoring time interval, multiple evaluation signals which are correlated with the operating characteristic variable are generated, wherein the evaluation signals are generated under at least substantially identical conditions, in particular driving conditions and/or steering conditions. In particular, in this case, all evaluation signals are correlated with the same operating characteristic variable, in particular of the steering actuator and/or of the steering system control unit, and/or are obtained from the same operating characteristic variable, in particular of the steering actuator and/or of the steering system control unit. Furthermore, the monitoring time interval in this case advantageously encompasses multiple steering cycles and may for example have a duration of several hours or days. Furthermore, the evaluation signals are in particular assigned to chronologically different time windows. The chronologically different time windows may in this case be assigned in particular to the same steering cycle and/or to different steering cycles. The time windows particularly advantageously each lie in a steering range in which forces acting on the tie rod apparatus, in particular a steering force exerted on the steering system setting element, advantageously a toothed-rack force, and a self-aligning force, which is in particular opposed to the steering force, of at least one vehicle wheel of the vehicle, at least substantially cancel one another out. The statement that the evaluation signals are generated "under at least substantially identical conditions" is to be understood in particular to mean that each of the evaluation signals is generated in a similar or identical vehicle speed range and/or steering range and/or in the presence of a similar or identical steering speed and/or rotor speed. In this way, it is possible in particular for a level of operational reliability to be further increased, and for temporary fluctuations in the operating characteristic variable and/or the evaluation signal, which are in particular not correlated with the state of the tie rod apparatus, to be reliably ruled out. Furthermore, statistically independent and unimportant changes in the operating characteristic variable can be reduced.

The evaluation signals could subsequently be evaluated in particular in the time domain. Furthermore, the evaluation signals could in particular also be synchronized and averaged in the time domain, such that a frequency spectrum is generated from the averaged evaluation signal, and, for the ascertainment and/or for the monitoring of the mechanical state of the tie rod apparatus, at least one spectral characteristic variable of the frequency spectrum from the averaged evaluation signal can be compared with a reference characteristic variable. In a particularly preferred embodiment, it is however proposed that, from each of the evaluation signals, an in particular dedicated frequency spectrum is generated, the frequency spectra are combined to form an averaged, common frequency spectrum, and, for the ascertainment and/or for the monitoring of the mechanical state of the tie rod apparatus, at least one spectral characteristic variable of the common frequency spectrum is compared with a reference characteristic variable. In this way, it is possible in particular to achieve an advantageously robust evaluation of the operating characteristic variable.

It is furthermore proposed that an advantageously machine-based learning routine, such as for example a random forest classifier and/or an artificial neural network, is used, which is provided for optimizing the ascertainment and/or monitoring of the mechanical state of the tie rod apparatus at least on the basis of the operating characteristic variable and/or at least one operating reference characteristic variable, for example by optimization of particular decider thresholds. Alternatively or additionally, the learning algorithm could however in particular also be provided for directly ascertaining and/or monitoring the mechanical state of the tie rod apparatus on the basis of the operating characteristic variable and/or at least one operating reference characteristic variable. It is advantageously the case that a typical behavior of the tie rod apparatus, in particular in the normal state and/or in the fault state, is learned by means of the learning routine. Preferably, the learning routine corresponds to a data-driven learning algorithm, wherein it is advantageously the case that a multiplicity of ascertained and/or ascertainable data and/or parameters of the tie rod apparatus, of the steering system and/or of the vehicle are used and/or are linked to one another. The learning routine is furthermore advantageously stored in the operating memory of the processing unit. In this context, an "operating reference characteristic variable" is to be understood in particular to mean an operating characteristic variable, in particular of the vehicle, preferably of the steering system and particularly advantageously of the steering actuator and/or of the steering system control unit, which operating characteristic variable reflects and/or indicates an intact and/or fully functional tie rod apparatus. The operating reference characteristic variable may in this case be ascertained and/or learned in particular by means of test measurements and/or by means of special algorithms and originate in particular from the vehicle with the tie rod apparatus itself and/or from further, structurally identical vehicles. In this way, it is possible in particular to achieve an advantageously simple and/or automatic optimization of the ascertainment and/or monitoring of the mechanical state of the tie rod apparatus. Furthermore, by means of the learning routine, it is advantageously possible for an evaluation to be simplified by virtue of the fact that the stipulation of specific reference characteristic variables, decider thresholds and/or reference points in particular in a frequency spectrum can be omitted, and the processing unit can automatically identify faulty and/or fault-free spectral characteristic variables in the frequency spectrum.

A further improvement in the learning routine can be achieved in particular if an in particular present vehicle speed and/or an in particular present steering speed are/is also fed to the learning routine for optimizing the ascertainment and/or monitoring of the mechanical state of the tie rod apparatus.

Here, it is not the intention for the method, the processing unit and the vehicle to be restricted to the use and embodiment described above. In particular, the method, the processing unit and vehicle may, in order to perform a function described herein, have a number of individual elements, components and units which differs from a number stated herein.

BRIEF DESCRIPTION OF THE DRAWINGS

Further advantages will emerge from the following description of the drawings. The drawings illustrate an exemplary embodiment of the disclosure. The drawings and the description encompass numerous aspects of the disclosure. A person skilled in the art will expediently also consider these aspects individually and combine them to form further meaningful combinations.

In the drawings.

DESCRIPTION DESCRIPTION

Figure 1A:
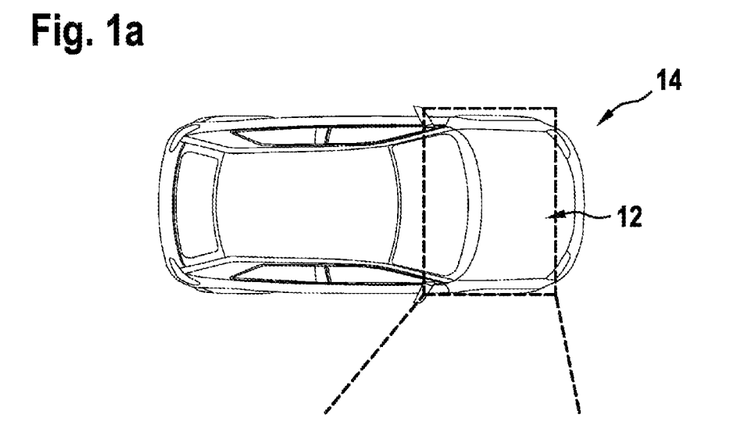
FIGS. 1a-b show an exemplary vehicle with a steering system comprising a tie rod apparatus in a simplified illustration.
Figure 1B:
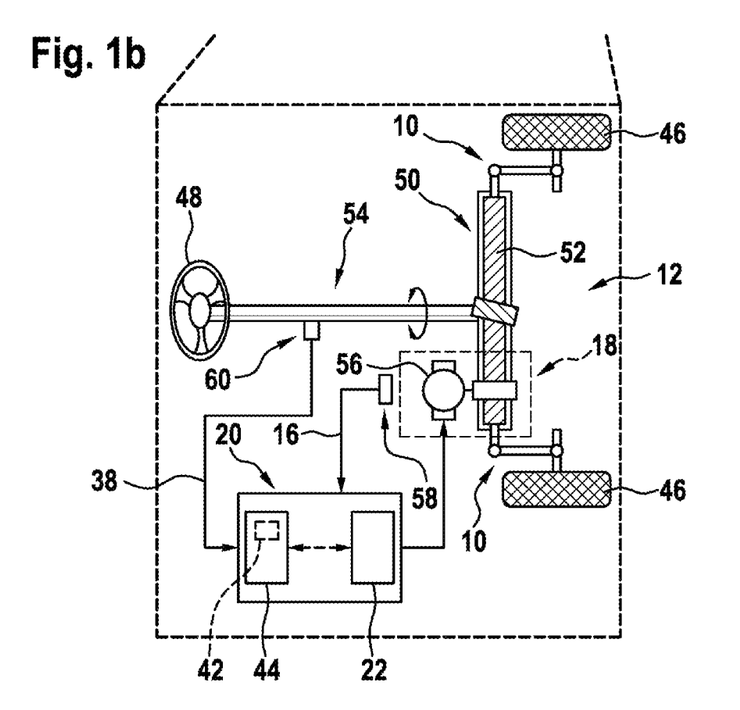

FIGS. 1a and 1b show a vehicle 14, which by way of example is in the form of a motor vehicle, with multiple vehicle wheels 46 and with a steering system 12, which in the present case is by way of example in the form of a conventional steering system, in a simplified illustration. The vehicle 14 may for example be a vehicle with a partially automated, highly automated and/or fully automated driving mode. The steering system 12 has an operative connection to the vehicle wheels 46 and is provided for influencing a direction of travel of the vehicle 14. Furthermore, the steering system 12 is in the form of an electrically-assisted steering system and, in the present case, has in particular an electric power steering system in the form of a servo steering system. It is however basically also conceivable for a steering system to be designed as a steer-by-wire steering system.

The steering system 12 comprises a steering handle 48, which in the present case is for example in the form of a steering wheel, for the application of a hand-imparted moment, a wheel steering angle setting means 50 which is by way of example in the form of a toothed-rack steering gear and which comprises a steering system setting element 52 and which is provided for converting a steering input at the steering handle 48 into a steering movement of the vehicle wheels 46, and a steering shaft 54 for the in particular mechanical connection of the steering handle 48 to the wheel steering angle setting means 50. Alternatively, a steering handle could also be in the form of a steering lever and/or steering ball or the like. It would also be possible in principle for a steering system to have no steering handle, for example in the case of a purely autonomously driving vehicle. Furthermore, it would also be possible for a steering shaft to only intermittently connect a steering handle to a wheel steering angle setting means, for example in the case of a vehicle with an autonomous driving mode and/or a steer-by-wire steering system with a mechanical fall-back level. In this context, it is self-evidently also conceivable for a steering shaft to be omitted entirely.

The steering system 12 furthermore comprises at least one tie rod apparatus 10. In the present case, the steering system 12 comprises two structurally identical tie rod apparatuses 10, wherein one of the tie rod apparatuses 10 is arranged on each vehicle side. The tie rod apparatuses each mechanically connect the wheel steering angle setting means 50, in particular the steering system setting element 52, to one of the vehicle wheels 46. Owing to the structurally identical configuration of the tie rod apparatuses 10, the following description will however be restricted to only one of the tie rod apparatuses 10.

Furthermore, the steering system 12 comprises a steering actuator 18. The steering actuator 18 is of at least partially electrical and/or electronic form. The steering actuator 18 is assigned to the wheel steering angle setting means 50. The steering actuator 18 has an operative connection to the steering system setting element 52. The steering actuator 18 is provided for providing a steering moment and transmitting this to the steering system setting element 52. In the present case, the steering actuator 18 is at least provided for transmitting a steering moment in the form of an assistance moment to the steering system setting element 52 and assisting the hand-imparted moment applied in particular by the driver.

For this purpose, the steering actuator 18 comprises at least one electric motor 56. The electric motor 56 is in the form of a servomotor, in the present case in particular in the form of a permanently excited synchronous motor. The electric motor 56 is coupled to the steering system setting element 52 and is provided for generating the steering moment. Alternatively, a steering actuator could however also have multiple electric motors. Furthermore, a steering actuator could additionally or alternatively also be provided for providing a steering moment for the, in particular direct, adjustment of a steering system setting element and, in this way, in particular for the automatic and/or autonomous control of a direction of travel of a vehicle.

Furthermore, the steering system 12 comprises at least one sensor unit 58, 60, in the present case in particular a first sensor unit 58 and a second sensor unit 60. The first sensor unit 58 is assigned to the steering actuator 18. The first sensor unit 58 is provided for detecting at least one operating characteristic variable 16 which is correlated with the steering actuator 18, for example a rotor angular acceleration, a rotor angular speed and/or a rotor position of the electric motor 56. The second sensor unit 60 is assigned to the steering shaft 54. The second sensor unit 60 is in the present case in the form of a steering angle sensor and is provided for detecting a further operating characteristic variable 38, in particular a steering angle signal and/or a torque signal. Here, the further operating characteristic variable 38 provides a set point specification, in particular in the form of a setpoint torque and/or a setpoint motor current, for the steering actuator 18 and is a measure for the hand-imparted moment applied in particular by the driver. In principle, it would however also be possible for a first sensor unit to be provided for detecting an actual motor current or the like.

Furthermore, a second sensor unit could also be in the form of an angle difference sensor or the like. Furthermore, a second sensor device could also be provided for detecting a setpoint torque and/or a setpoint motor current.

Furthermore, the steering system 12 has a steering system control unit 20. The steering system control unit 20 has an operative connection to the sensor units 58, 60 and to the steering actuator 18. The steering system control unit 20 is provided for receiving the operating characteristic variables 16, 38 and actuating the electric motor 56 in a manner dependent on the operating characteristic variables 16, 38.

For this purpose, the steering system control unit 20 comprises a processing unit 44. The processing unit 44 comprises at least one processor (not illustrated), for example in the form of a microprocessor, and at least one operating memory (not illustrated). Furthermore, the processing unit 44 comprises at least one operating program which is stored in the operating memory and which has at least one calculation routine, at least one open-loop control routine, at least one closed-loop control routine and at least one evaluation routine.

Furthermore, in the present case, the steering system control unit 20 comprises a closed-loop steering system controller 22. The closed-loop steering system controller 22 has an operative connection to the processing unit 44. Furthermore, the closed-loop steering system controller 22 has an operative connection to the steering actuator 18. The closed-loop steering system controller 22 is in the present case provided for field-oriented closed-loop control of the steering actuator 18 and in particular of the electric motor 56.

Furthermore, the vehicle 14 and/or the steering system 12 may comprise further components and/or assemblies, such as for example at least one further sensor unit (not illustrated), for example in the form of a lateral acceleration sensor, a yaw rate sensor, a vehicle speed sensor, a wheel rotational speed sensor and/or a gyroscopic sensor, a closed-loop driving dynamics control system (not illustrated) and/or an output unit (not illustrated) for outputting a notification message.

To increase an operational reliability of vehicles, there is now a demand, in the case of steering systems such as in particular the steering system 12 mentioned in the introduction, to ascertain and/or to monitor a mechanical state of a tie rod apparatus and in particular a degree of steering play caused by mechanical wear. In conventional steering systems, there is for example the risk that a driver becomes familiar with the degree of steering play after a certain amount of time and the steering play thus ceases to be noticed over the course of time. By contrast, in the case of steer-by-wire steering systems, owing to the absence of a mechanical through-connection, a state of the tie rod apparatus and/or a degree of steering play can be haptically transmitted only very indirectly, or not at all, to a self-aligning moment of a steering handle, such that a haptic detection of the degree of steering play by the driver is virtually ruled out. A similar situation applies to partially automated, highly automated and/or fully automated driving processes in which the driver receives no haptic feedback from the steering system, whereby, for example, faults and/or defects in a tie rod apparatus or a degree of steering play can no longer be identified in good time, and hazardous situations can arise for example owing to a worn-out tie rod head and/or an uncoupling or breakaway of the tie rod head.

For this reason, a method for the automatic ascertainment and/or for the automatic monitoring of a mechanical state of the tie rod apparatus 10 is proposed. In the present case, the processing unit 44 is provided for carrying out the method for the automatic ascertainment and/or for the automatic monitoring of the mechanical state of the tie rod apparatus 10 and, for this purpose, has in particular a computer program with corresponding program code means. The mechanical state of the tie rod apparatus 10 is in the present case linked to a degree of steering play caused by mechanical wear.

According to the disclosure, for the ascertainment and/or for the monitoring of the mechanical state of the tie rod apparatus 10, at least one operating characteristic variable, which is correlated with a steering movement, of the steering actuator 18 and/or of the steering system control unit 20, in the present case by way of example the operating characteristic variable 16 of the steering actuator 18, for example in the form of a rotor position, a rotor angular acceleration and/or a rotor angular speed of the electric motor 56, is detected and evaluated. Here, a detection and/or evaluation of the operating characteristic variable 16 may take place, depending on vehicle model and/or safety requirements, both during driving operation of the vehicle 14 and when the vehicle 14 is at a standstill. An evaluation of the operating characteristic variable 16 furthermore takes place, in the present case, in a steering range in which forces 28, 30 acting on the tie rod apparatus 10, in particular a steering force 28 exerted on the steering system setting element 52 and a self-aligning force 30, which is opposed to the steering force 28, of at least one of the vehicle wheels 46, at least substantially cancel one another out (in this regard, cf. in particular also FIG. 2). If, in the evaluation of the operating characteristic variable 16, a behavior of the operating characteristic variable 16 which differs from a normal state is detected, then a fault state, in particular in the form of a mechanical defect of the tie rod apparatus 10, is inferred. In such a fault state, it is advantageously the case that a notification message and/or warning message is generated and output by means of the output unit. As operating characteristic variable, it would basically self-evidently also be possible to use any other operating characteristic variable of a steering actuator and/or of a steering system control unit, for example an energy consumption, a current consumption, and actual motor moment and/or a torque of the steering actuator and/or an energy consumption, a current consumption, a control signal, a setpoint motor moment and/or a setpoint torque of the steering system control unit. Furthermore, it would also be possible for an operating characteristic variable to be evaluated in a steering range in which forces acting on a tie rod apparatus do not cancel one another out but have, for example, a particular ratio with respect to one another. Furthermore, it is also conceivable for multiple further operating characteristic variables, in particular of a vehicle sensor arrangement, of a closed-loop driving dynamics control system and/or advantageously of a steering actuator and/or of a steering system control unit, to be ascertained and taken into consideration in the ascertainment and/or monitoring of the mechanical state of the tie rod apparatus.

Figure 2:
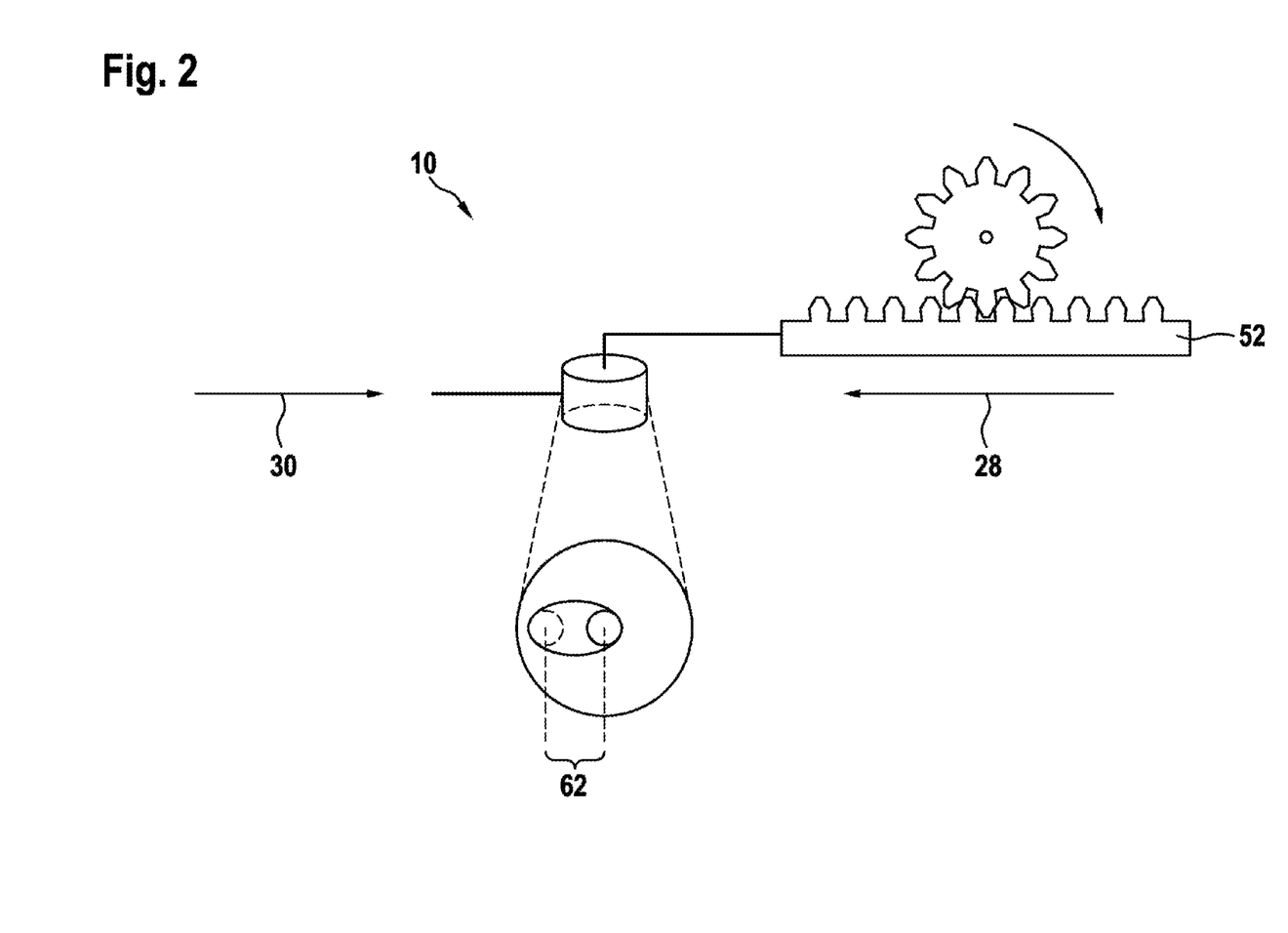
FIG. 2 shows the tie rod apparatus in a schematic illustration, with forces which act on the tie rod apparatus being indicated.

The mechanical state of the tie rod apparatus 10 can be monitored particularly easily in said steering range. Here, in particular, use is made of the fact that, in the steering range, there is an equilibrium of forces acting on the tie rod apparatus 10, and in the fault state, in particular in the case of a mechanical defect of the tie rod apparatus 10 and a resulting increased steering play, a dead travel 62 is passed through in a virtually force-free manner (cf. in particular FIG. 2). In the fault state, in the steering range and/or in the dead travel 62 and in particular in the case of a setpoint torque and/or setpoint motor current predefined by the steering system control unit 20, there is a briefly reduced moment of inertia at the transition between the electric motor 56 and the steering system setting element 52, which, in accordance with $$\alpha_{Rotor} = M_{Soll}/I_{Stell}$$

leads to a brief change in the rotor angular acceleration of the electric motor 56. Here, $\alpha_{Rotor}$ describes the rotor angular acceleration of the electric motor 56, $M_{Soll}$ describes the setpoint torque and/or the setpoint motor current, and $I_{Stell}$ describes the moment of inertia. Said brief change in the rotor angular acceleration is transmitted to other operating characteristic variables of the steering actuator 18 and/or of the steering system control unit 20, such as for example an actual motor moment, a rotor position, a rotor angular speed and/or a torque of the steering actuator 18 and/or a setpoint motor moment and/or a setpoint torque of the steering system control unit 20, such that the degree of steering play can in principle be detected through evaluation of each of these operating characteristic variables.

Furthermore, the operating characteristic variable 16 is linked to a closed-loop controller characteristic, in particular a closed-loop controller intervention, of the closed-loop steering controller 22. An analogous situation in particular also applies for the abovementioned other operating characteristic variables of the steering actuator 18 and/or of the steering system control unit 20. The closed-loop controller characteristic serves here as an indicator for the mechanical state of the tie rod apparatus 10. Here, use is made of the fact that, in the steering range, a closed-loop controller characteristic of the closed-loop steering controller 22 in the normal state differs from a closed-loop controller characteristic of the closed-loop steering controller 22 in the fault state. In the present case, the virtually force-free passage through the dead travel 62 leads to a successive readjustment of the closed-loop steering system controller 22, which is reflected in particular in the operating characteristic variable 16 and the other operating characteristic variables and can consequently be detected. In particular, here, during the virtually force-free passage through the dead travel 62, the closed loop steering controller 22 detects an actual rotor speed and an actual motor current which do not match one another, and consequently gradually readjusts a setpoint motor current, which leads to the different closed-loop controller characteristic of the closed-loop steering controller 22 in the fault state.

Figure 3A:
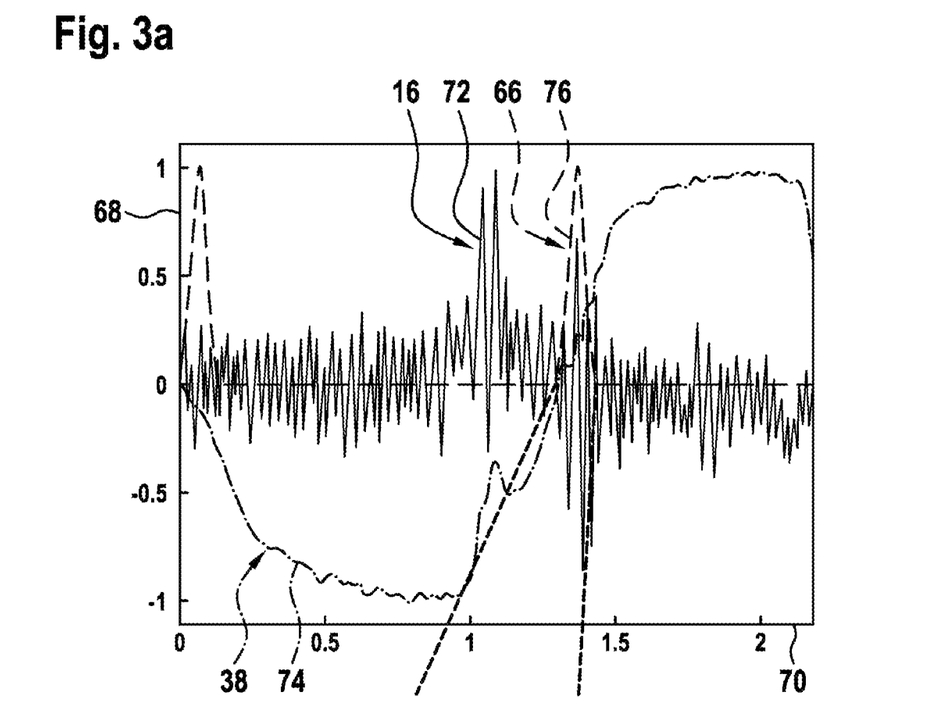
FIGS. 3a-b show exemplary diagrams of various signals for the ascertainment and/or for the monitoring of a mechanical state of the tie rod apparatus.
Figure 3B:
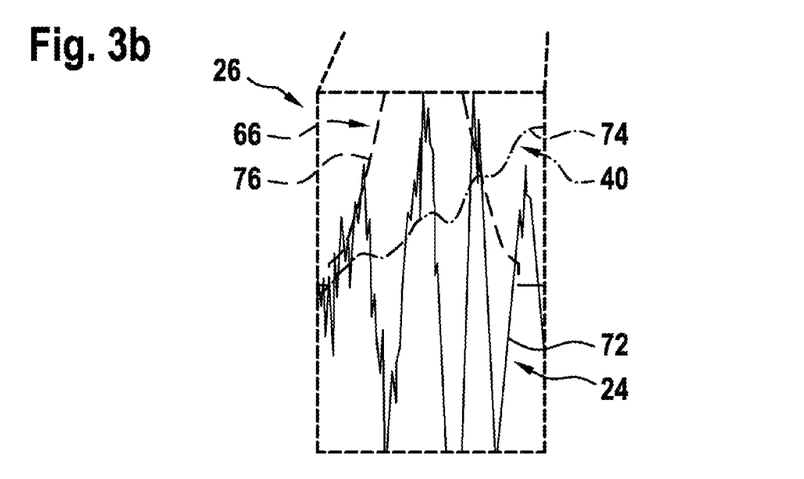

For the ascertainment and/or evaluation of the state of the tie rod apparatus 10, the operating characteristic variable 16 is in the present case furthermore ascertained during an entire steering cycle, and an evaluation signal 24 which is correlated with the operating characteristic variable 16 is generated by virtue of the operating characteristic variable 16 being limited to a defined time window 26 (cf. in particular also FIGS. 3a and 3b). The time window 26 lies in the steering range in which, in particular, the forces acting on the tie rod apparatus 10 at least substantially cancel one another out. Furthermore, a duration of the time window 26 is in the present case between 75 ms and 300 ms. In this context, use is made of the fact that fault-related closed-loop controller interventions of the closed-loop steering controller 22 occur only in the steering range and/or during the passage through the dead travel 62, such that the abovementioned time window 26 is particularly relevant for the state of the tie rod apparatus 10. It is however alternatively also conceivable to omit such windowing of the operating characteristic variable 16, for example by virtue of the operating characteristic variable 16 being detected only in a relevant time range or over multiple steering cycles, wherein, in particular, changes in the integration result can serve as an indicator for the mechanical state of the tie rod apparatus 10.

An evaluation of the evaluation signal 24 is advantageously performed in the frequency domain. For this purpose, a frequency spectrum 32 is generated from the evaluation signal 24 (cf. in particular FIG. 4). For the ascertainment and/or for the monitoring of the mechanical state of the tie rod apparatus 10, at least one spectral characteristic variable 34, such as for example a frequency value and/or an amplitude value of an extreme value, of the frequency spectrum 32 is subsequently compared with a reference characteristic variable 36 of a reference frequency spectrum 64, wherein the reference frequency spectrum 64 in particular reflects and/or indicates an intact and/or fully functional tie rod apparatus 10. In the present case, the processing unit 44 is thus provided, for the ascertainment and/or for the monitoring of the mechanical state of the tie rod apparatus 10, to analyze the frequency spectrum 32, to ascertain and/or select the at least one spectral characteristic variable 34 of the frequency spectrum 32, and to compare same with the corresponding reference characteristic variable 36 of the reference frequency spectrum 64. On the basis of a comparison of the spectral characteristic variable 34 with the reference characteristic variable 36, the processing unit 44 can then infer a present state and/or a possible fault and/or defect of the tie rod apparatus 10 and/or ascertain a present state and/or a possible fault and/or defect of the tie rod apparatus 10. If, in the comparison of the spectral characteristic variable 34 with the reference characteristic variable 36, for example an overshooting or undershooting of defined threshold values is ascertained, then a fault state, in particular in the form of a mechanical defect of the tie rod apparatus 10, is inferred. It would alternatively also be possible for an evaluation signal to be evaluated in the time domain, for example on the basis of a comparison of the evaluation signal with a setpoint and/or reference signal or on the basis of a characteristic profile of the evaluation signal in a fault state. It is furthermore conceivable to omit a reference frequency spectrum. In this case, it is for example conceivable for the reference characteristic variable to correspond to a defined decider threshold, in particular for a defined frequency value and/or amplitude value, or multiple defined decider thresholds, in particular for multiple defined frequency values and/or amplitude values.

To further improve the ascertainment and/or monitoring of the tie rod apparatus 10, provision may furthermore be made for multiple, for example at least three or at least ten, evaluation signals 24 which are correlated with the operating characteristic variable 16 to be generated during an entire monitoring time interval, which may for example encompass multiple steering cycles and have a duration of several hours or days, whereby it is possible in particular for temporary fluctuations in the operating characteristic variable 16 and/or evaluation signal 24, which are not correlated with the state of the tie rod apparatus 10, to be reliably ruled out. The evaluation signals 24 are in this case generated under at least substantially identical conditions, in particular at least substantially identical driving conditions and/or steering conditions. Furthermore, it is thus the case that all evaluation signals 24 are correlated with the same operating characteristic variable 16 and are obtained from the same operating characteristic variable 16. Furthermore, here, the evaluation signals 24 are assigned to chronologically different time windows 24, which advantageously each lie in a steering range in which the forces 28, 30 acting on the tie rod apparatus 10 at least substantially cancel one another out. Said evaluation signals 24 may subsequently in turn be advantageously evaluated in the frequency domain. Here, a frequency spectrum 32 may be generated from each of the evaluation signals 24, the frequency spectra 32 may be combined to form an averaged, common frequency spectrum, and, for the ascertainment and/or for the monitoring of the mechanical state of the tie rod apparatus 10, at least one spectral characteristic variable of the common frequency spectrum may be combined with a reference characteristic variable 36. Alternatively, it is however also possible for the evaluation signals 24 to be evaluated or synchronized and averaged in the time domain, wherein, in the latter case, a frequency spectrum is advantageously generated from the averaged evaluation signal, and, for the ascertainment and/or for the monitoring of the mechanical state of the tie rod apparatus, at least one spectral characteristic variable of the frequency spectrum from the averaged evaluation signal can be compared with a reference characteristic variable.

Furthermore, in the present case, at least one further operating characteristic variable 38 may be detected, in particular during the same steering cycle as the operating characteristic variable 16, and a further evaluation signal which is correlated with the further operating characteristic variable 38 and which is limited to the time window 26 may be generated, which further evaluation signal is taken into consideration in the ascertainment and/or monitoring of the mechanical state of the tie rod apparatus 10, whereby it is possible in particular to achieve a particularly reliable and/or accurate ascertainment of the mechanical state of the tie rod apparatus 10. The further operating characteristic variable 38 may for example be the steering angle signal and/or the torque signal of the second sensor unit 60 and/or an actual torque, a setpoint torque, and actual motor current and/or a setpoint motor current. Here, the further operating characteristic variable 38 and in particular the further evaluation signal 40 serves for the verification and/or checking of plausibility of the state of the tie rod apparatus 10 ascertained by means of the operating characteristic variable 16 and in particular of the evaluation signal 24. Alternatively, it would however also be possible for a further operating characteristic variable to take the form of any other operating characteristic variable, such as for example a further operating characteristic variable of a steering actuator and/or of a steering system control unit and/or an operating characteristic variable of a lateral acceleration sensor, of a yaw rate sensor, of a gyroscopic sensor and/or of a closed-loop driving dynamics control system. Furthermore, it would be possible for multiple further operating characteristic variables to be detected, and for a further evaluation signal limited to a time window to be generated from each of the further operating characteristic variables for the verification and/or checking of plausibility of a state of a tie rod apparatus. It is however basically also conceivable to omit a detection and/or evaluation of a further operating characteristic variable.

Furthermore, the processing unit 44 in the present case comprises a machine learning routine 42. The learning routine 42 is stored in the operating memory of the processing unit 44. The learning routine 42 is provided for optimizing the ascertainment and/or monitoring of the mechanical state of the tie rod apparatus 10 at least on the basis of the operating characteristic variable 16. For this purpose, a multiplicity of ascertained and/or ascertainable data and/or parameters of the tie rod apparatus 10, of the steering system 12 and/or of the vehicle 14 may be fed to the learning routine 42. In the present case, at least a present vehicle speed of the vehicle 14 and a present steering speed of the vehicle 14 may be fed to the learning routine 42 for optimizing the ascertainment and/or monitoring of the mechanical state of the tie rod apparatus 10. In principle, it would however also be possible to omit such a learning routine.

FIGS. 3a and 3b show once again exemplary diagrams of a profile with respect to time of the operating characteristic variable 16 and/or of the evaluation signal 24, of a profile with respect to time of the further operating characteristic variable 38, which in this case is by way of example in the form of a steering angle signal and/or torque signal, and/or of the further evaluation signal 40, and a window function 66 which is correlated with the time window 26. An ordinate axis 68 takes the form of a variable axis. A time in [s] is plotted on an abscissa axis 70. A first curve 72 shows the operating characteristic variable 16 and/or the evaluation signal 24. A second curve 74 shows the further operating characteristic variable 38 and/or the further evaluation signal 40. A third curve 76 shows the window function 66 which is correlated with the time window 26. The steering angle signal and/or torque signal and in particular a zero crossing of the steering angle signal and/or torque signal furthermore serves in this case for the setting of the time window 26.

Figure 4:
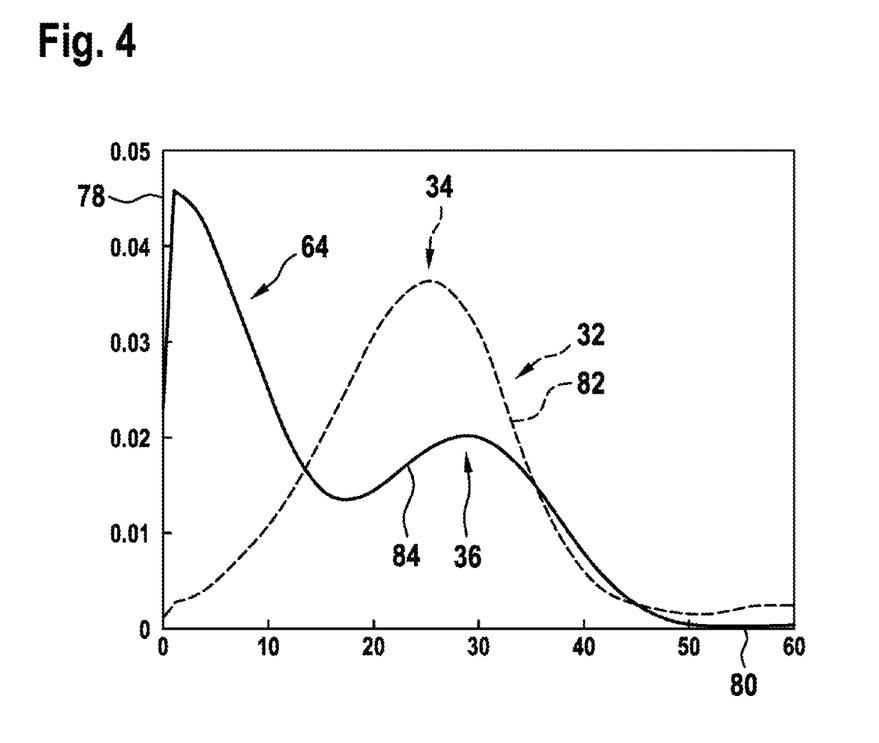
FIG. 4 shows an exemplary further diagram with various signals for the ascertainment and/or for the monitoring of the mechanical state of the tie rod apparatus.

FIG. 4 illustrates exemplary diagrams of the frequency spectrum 32 and of the reference frequency spectrum 64. An ordinate axis 78 again takes the form of a variable axis. A frequency in [Hz] is plotted on an abscissa axis 80. A first curve 82 shows the frequency spectrum 32 generated from the evaluation signal 24, with the spectral characteristic variable 34. A second curve 84 shows the reference frequency spectrum 64 with the reference characteristic variable 36. Here, it can for example be seen that a frequency value and an amplitude value of extreme values, in particular of the spectral characteristic variable 34 and of the reference characteristic variable 36, differ from one another, such that a present state and/or a possible fault and/or defect of the tie rod apparatus 10 can be inferred on the basis of a comparison of the spectral characteristic variable 34 with the reference characteristic variable 36. Alternatively or in addition, a comparison of a spectral characteristic variable with a reference characteristic variable could self-evidently also be performed on the basis of a number of extreme values, a position of saddle points, a calculation of an integral value in a defined frequency range, or in some other way.

Figure 5:
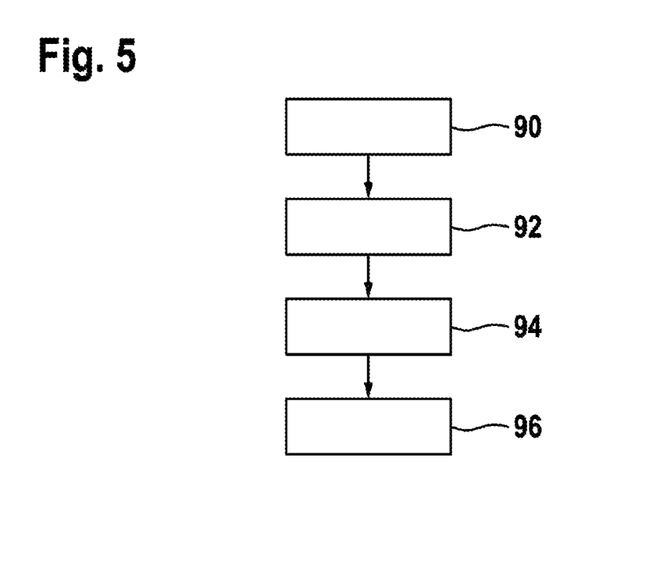
FIG. 5 shows an exemplary flow diagram with main method steps of a method for the ascertainment and/or for the monitoring of a mechanical state of the tie rod apparatus.

Finally, FIG. 5 shows an exemplary flow diagram with main method steps of the method for the ascertainment and/or for the monitoring of the mechanical state of the tie rod apparatus 10.

In a method step 90, the operating characteristic variable 16 is detected, in particular by means of the first sensor unit 58, and is provided to the processing unit 44 for further processing. A detection and/or evaluation of the operating characteristic variable 16 may in this case be performed, depending on vehicle model and/or safety requirements, both during driving operation of the vehicle 14 and when the vehicle 14 is at a standstill.

In a method step 92, for the ascertainment and/or for the monitoring of the mechanical state of the tie rod apparatus 10, an evaluation signal 24 which is correlated with the operating characteristic variable 16 is generated by virtue of the operating characteristic variable 16 being limited to the time window 26.

In a method step 94, a frequency spectrum 32 is advantageously generated from the evaluation signal 24, for example by means of a discrete Fourier transformation (DFT), in particular by means of a fast Fourier transformation (FFT) and/or Welch's method, and/or by means of a periodogram or the like.

In a method step 96, the frequency spectrum 32 is analyzed, and the at least one spectral characteristic variable 34 of the frequency spectrum 32 is ascertained and/or selected. Subsequently, the spectral characteristic variable 34 can be compared with the corresponding reference characteristic variable 36 of the reference frequency spectrum 64 in order to ascertain the mechanical state of the tie rod apparatus 10.

This may be followed by optional method steps such as for example an ascertainment and/or consideration of the further operating characteristic variable 38 and/or the generation of a notification message and/or warning message.

Here, the exemplary flow diagram in FIG. 5 is in particular intended to describe, merely by way of example, a method for the ascertainment and/or for the monitoring of the mechanical state of the tie rod apparatus 10. In particular, individual method steps and/or a sequence of the method steps may vary. Here, it would also be possible in principle for a limitation of an operating characteristic variable and/or an evaluation in the frequency domain to be omitted, and for example for an evaluation to be performed in the time domain.

The invention claimed is:

1. A method for at least one of ascertaining and monitoring a mechanical state of at least one tie rod apparatus of an electrically assisted steering system of a vehicle, wherein the mechanical state of the tie rod apparatus is linked to a degree of steering play caused in particular by mechanical wear, comprising:
ascertaining at least one operating characteristic variable, which is correlated with a steering movement of at least one of a steering actuator and of at least one steering system control unit of the steering system;
evaluating the ascertained at least one operating characteristic, to at least one of ascertain and evaluate the mechanical state of the tie rod apparatus, in a steering range in which forces acting on the tie rod apparatus, in the form of a steering force exerted on a steering system setting element and a self-aligning force, which is opposed to the steering force, of at least one vehicle wheel of the vehicle, at least substantially cancel one another out; and generating, with a processing unit, a warning message, in response to the evaluation, that increased steering play is detected.

2. The method as claimed in claim 1 wherein the operating characteristic variable is at least one of ascertained and evaluated during driving operation of the vehicle.

3. The method as claimed in claim 1, wherein the operating characteristic variable is at least one of ascertained and evaluated when the vehicle is at a standstill.

4. The method as claimed in claim 1, wherein the at least one operating characteristic variable is linked to a closed-loop controller characteristic of a closed-loop steering system controller of the steering system.

5. The method as claimed in claim 1, wherein:
the at least one operating characteristic variable is ascertained at least during an entire steering cycle; and
an evaluation signal which is correlated with the at least one operating characteristic variable is generated by virtue of the at least one operating characteristic variable being limited to a defined time window for the at least one of the ascertainment and monitoring of the mechanical state of the tie rod apparatus.

6. The method as claimed in claim 5, wherein the time window lies in the steering range in which the forces acting on the tie rod apparatus at least substantially cancel one another out.

7. The method as claimed in claim 5 wherein:
a frequency spectrum is generated from the evaluation signal; and
at least one spectral characteristic variable of the frequency spectrum is compared with a reference characteristic variable for the at least one of the ascertainment and the monitoring of the mechanical state of the tie rod apparatus.

8. The method as claimed in claim 5, wherein:
at least one further operating characteristic variable is detected, and
a further evaluation signal, which is correlated with the further operating characteristic variable and which is limited to the time window, is generated, which further evaluation signal is taken into consideration in the at least one of the ascertainment and the monitoring of the mechanical state of the tie rod apparatus.

9. The method as claimed in claim 1, wherein;
for the at least one of the ascertainment and the monitoring of the mechanical state of the tie rod apparatus, during a monitoring time interval, multiple evaluation signals which are correlated with the at least one operating characteristic variable are generated;
the evaluation signals are generated under at least substantially identical conditions;
a frequency spectrum is generated from each of the generated evaluation signals;
the frequency spectra are combined to form an averaged, common frequency spectrum; and
for at least one of the ascertainment and the monitoring of the mechanical state of the tie rod apparatus, at least one spectral characteristic variable of the common frequency spectrum is compared with at least one reference characteristic variable.

10. The method as claimed in claim 9, wherein
a learning routine is used which is provided for optimizing the at least one of the ascertainment and the monitoring of the mechanical state of the tie rod apparatus on the basis of at least one of the at least one operating characteristic variable and the at least one reference characteristic variable.

11. The method as claimed in claim 10, wherein:
at least one of a vehicle speed and a steering speed is fed to the learning routine for optimizing the at least one of the ascertainment and the monitoring of the mechanical state of the tie rod apparatus.

12. A system for at least one of ascertaining and monitoring a mechanical state of at least one tie rod apparatus of an electrically assisted steering system of a vehicle, wherein the mechanical state of the tie rod apparatus is linked to a degree of steering play caused in particular by mechanical wear, comprising:
a memory having program instructions stored therein; and
a processor operably connected to the memory and configured to execute the program instructions to
ascertain at least one operating characteristic variable, which is correlated with a steering movement of at least one of a steering actuator and of at least one steering system control unit of the steering system, and
evaluating the ascertained at least one operating characteristic to at least one of ascertain and evaluate the mechanical state of the tie rod apparatus in a steering range in which forces acting on the tie rod apparatus, in the form of a steering force exerted on a steering system setting element and a self-aligning force, which is opposed to the steering force, of at least one vehicle wheel of the vehicle, at least substantially cancel one another out, and
generate a warning message in response to the evaluation that increased steering play is detected.

13. A vehicle with an electrically assisted steering system comprising:
a wheel steering angle setting device, which comprises at least one steering system setting element;
a tie rod apparatus:
a steering actuator;
a memory including program instructions stored therein; and
at least one steering system control unit including a processing unit operably connected to the memory and configured to execute the program instructions to
ascertain at least one operating characteristic variable, which is correlated with a steering movement of at least one of the steering actuator and the steering system control unit,
evaluate the ascertained at least one operating characteristic to at least one of ascertain and evaluate a mechanical state of the tie rod apparatus in a steering range in which forces acting on the tie rod apparatus, in the form of a steering force exerted on the steering system setting element and a self-aligning force, which is opposed to the steering force, of at least one vehicle wheel of the vehicle, at least substantially cancel one another out, wherein the mechanical state of the tie rod apparatus is linked to a degree of steering play caused in particular by mechanical wear, and
generate a warning message in response to the evaluation that increased steering play is detected.

14. A method for at least one of ascertaining and monitoring a mechanical state of at least one tie rod apparatus of an electrically assisted steering system of a vehicle, comprising:

ascertaining at least one operating characteristic variable, which is correlated with a steering movement of at least one of a steering actuator and of at least one steering system control unit of the steering system;

evaluating the ascertained at least one operating characteristic, to at least one of ascertain and evaluate the mechanical state of the tie rod apparatus, in a steering range in which forces acting on the tie rod apparatus, in the form of a steering force exerted on a steering system setting element and a self-aligning force, which is opposed to the steering force, of at least one vehicle wheel of the vehicle, at least substantially cancel one another out; and generating, with a processing unit, a warning message in response to the evaluation, wherein:

the at least one operating characteristic variable is ascertained at least during an entire steering cycle;

an evaluation signal which is correlated with the at least one operating characteristic variable is generated by virtue of the at least one operating characteristic variable being limited to a defined time window for the at least one of the ascertainment and monitoring of the mechanical state of the tie rod apparatus;

a frequency spectrum is generated from the evaluation signal; and at least one spectral characteristic variable of the frequency spectrum is compared with a reference characteristic variable for the at least one of the ascertainment and the monitoring of the mechanical state of the tie rod apparatus.

* * * * *